Sept. 22, 1959　　　　　W. RODDER　　　　　2,905,243
TUBE CUT-OFF MACHINE WITH RADIALLY MOVABLE ROTARY CUTTER
Filed May 16, 1955　　　　　　　　　　　　8 Sheets-Sheet 1

FIG. 1

INVENTOR.
WILLIAM RODDER
BY Bosworth, Sessions,
Herrstrom & Lawler
ATTORNEYS

Sept. 22, 1959                W. RODDER                2,905,243
TUBE CUT-OFF MACHINE WITH RADIALLY MOVABLE ROTARY CUTTER
Filed May 16, 1955                                    8 Sheets-Sheet 2

INVENTOR.
WILLIAM RODDER
BY Bosworth, Sessions,
Herndon + Lawler
ATTORNEYS

Sept. 22, 1959  W. RODDER  2,905,243
TUBE CUT-OFF MACHINE WITH RADIALLY MOVABLE ROTARY CUTTER
Filed May 16, 1955  8 Sheets-Sheet 3

FIG. 3

INVENTOR.
WILLIAM RODDER
BY Bosworth, Sessions,
Herretron & Lawler
ATTORNEYS

FIG. 4

INVENTOR.
WILLIAM RODDER
BY Bosworth, Sessions,
Herström & Lawler
ATTORNEYS

FIG. 7

INVENTOR.
WILLIAM RODDER
BY Bosworth, Sessions,
Hernstrom + Lawler
ATTORNEYS

INVENTOR.
WILLIAM RODDER
BY Bosworth, Sessions,
Herrstrom & Lawler
ATTORNEYS

United States Patent Office 2,905,243
Patented Sept. 22, 1959

2,905,243

TUBE CUT-OFF MACHINE WITH RADIALLY MOVABLE ROTARY CUTTER

William Rodder, Poland, Ohio, assignor, by mesne assignments, to Blaw-Knox Company, Pittsburgh, Pa., a corporation of Delaware Application May 16, 1955, Serial No. 508,683

5 Claims. (Cl. 164—60)

This invention relates to tube cut-off machines, and more particularly to machines adapted to cut off the ends of large tube sections square with the axis of the tube. Such machines are utilized in the manufacture of hot rolled tube, the sections of which are produced with irregular ends that must be cut off square. The machine, of course, may be utilized in the production of other types of tube or pipe and wherever it is desired to cut tube accurately, with the cut perpendicular to the axis of the work.

A general object of the invention is the provision of an improved pipe or tube cut-off machine. Other objects of the invention include the provision of a comparatively compact tube cut-off machine, the provision of a rapid-acting tube cut-off machine that is capable of cutting off the ends of large tube sections at relatively high speed, and the provision of a tube cut-off machine embodying a drive mechanism that has great flexibility in operation, enabling the machine to operate rapidly and accurately on tube having a wide range of sizes.

Other objects and advantages of the invention will become apparent from the following description of a preferred form thereof, reference being made to the accompanying drawings, in which—

Figure 1:
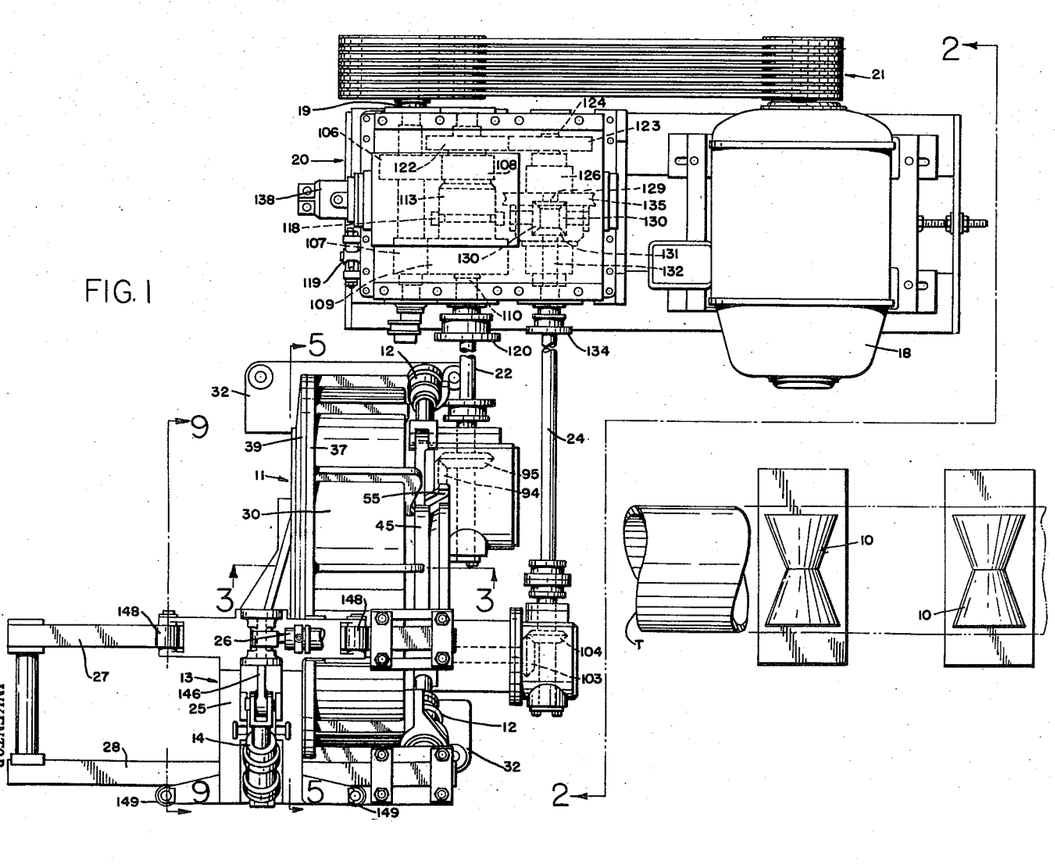
Figure 1 is a top plan view of a preferred form of tube or pipe cut-off machine embodying my invention.

*General arrangement.*—A machine embodying a preferred form of my invention consists of a conveyor 10 adapted to convey a length of pipe or tube T and position it properly within the cutter head indicated in general at 11 in Figure 1. After the tube has been positioned in the cutter head, it is clamped in a clamp, to be described in detail below, by means of clamping cylinders 12, while the end of the tube to be cut off is clamped by a separate crop end clamp mechanism 13 (shown in broken lines in Figure 3) actuated by clamping cylinder 14. With the tube so clamped and held stationary, tool carriers 15 (see Figures 3 and 5) are caused to rotate with respect to the tube and at the same time, the cutting tools 16 carried by the tool carriers are advanced radially inwardly to cut off the end of the tube. Power for rotating the tool carriers and advancing the tools is supplied by a motor 18 which drives the input shaft 19 of gear box 20 through any convenient drive such as the multiple V-belt drive 21. Output shafts 22 and 24 leading from the gear box 20 respectively rotate the supports for the cutting tools and control the advancing and retracting of the tools, as described in detail below.

After the end of a tube has been cut off, it is retained in the crop end clamp 13 by the cylinder 14, and the crop end clamp and cylinder carrying the end of the tube are moved by means of a hydraulic advancing cylinder 26 along rails 27 and 28 to carry the crop end of the pipe away from the cutting head. Thereafter the crop end is released and preferably is discharged by means of a suitable chute, not shown, to any convenient location or instrumentality such as a crusher.

Machines of the type described herein are preferably operated in pairs, one machine of a pair being adapted to cut off one end of a tube section, while the other machine of the pair is adapted to cut off the other end of the tube section. This particular arrangement of machines, however, forms no part of the present invention and, accordingly, only one machine is disclosed herein.

*Cutter head.*—The tube to be cut is clamped within the cutter head 11, which, as shown particularly in Figures 2, 3, 4, and 5 comprises of a housing member 30 which is generally circular in form except for a base portion 31. The base portion 31 is provided with supporting brackets 32, which support the cutter head and housing on any suitable foundation, such as rails 33. The circular portion of the housing 30 is open at both ends, and at the entry end thereof is provided with a cylindrical inner sleeve portion 35 of reduced diameter which supports the tube clamping mechanism indicated in general at 36. The discharge end of the housing is flanged as shown at 37, and the flanged opening is partially closed by an inwardly extending cover plate 39 which is bolted to the flange 37. The cutter heads and tool carriers 15 are rotatably supported within the housing in the space defined generally by the cylindrical portion 30 of the housing and the cover plate 39.

In order to clamp the tube securely and hold it stationary while the rotating cutting tools sever the crop end of the tube, the clamping mechanism 36 is provided within the sleeve portion 35 of the housing. This mechanism comprises an actuating ring 42 (Figures 3 and 4) rotatably supported within the sleeve portion 35 and engaging bearing liners 43 which are secured to the inner surface of the sleeve. The actuating member 42 has an outwardly extending end flange 44. Split retainer ring segments 45 secured to the end of the sleeve portion 35 function to hold the actuating ring against axial movement.

Figure 3:
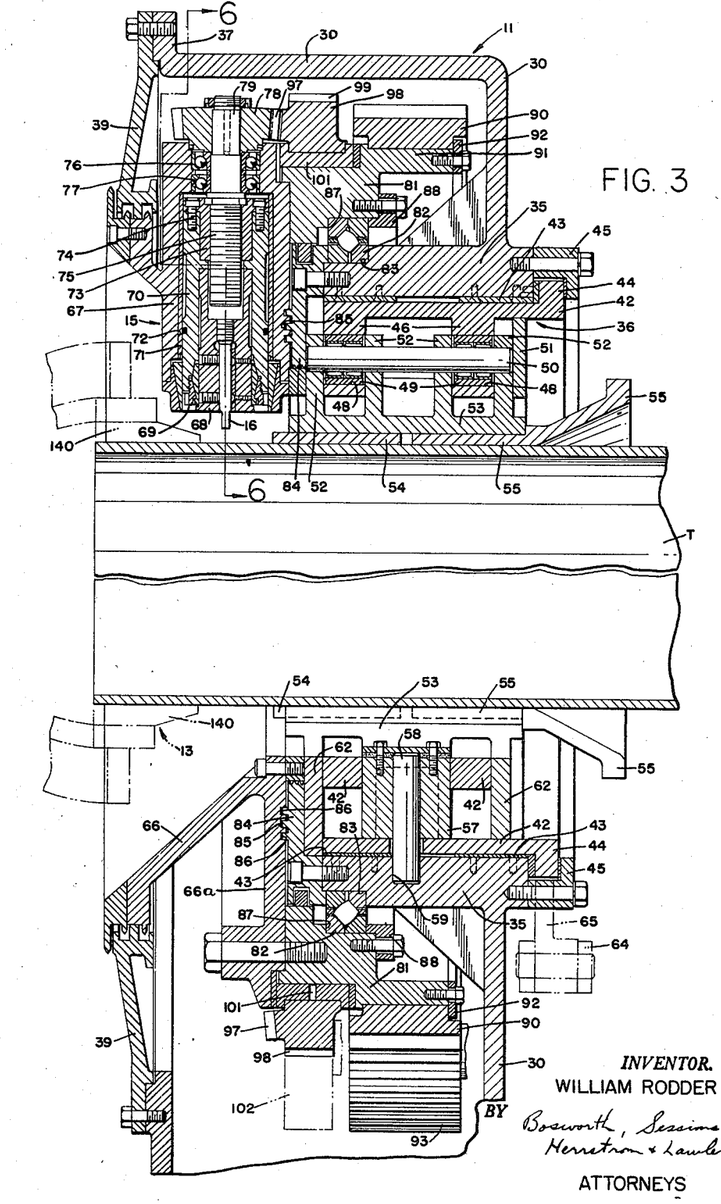
Figure 3 is a transverse axial section on an enlarged scale through the cutting head of the machine of Figure 1, the section being taken along line 3—3 of Figure 1.
Figure 4:
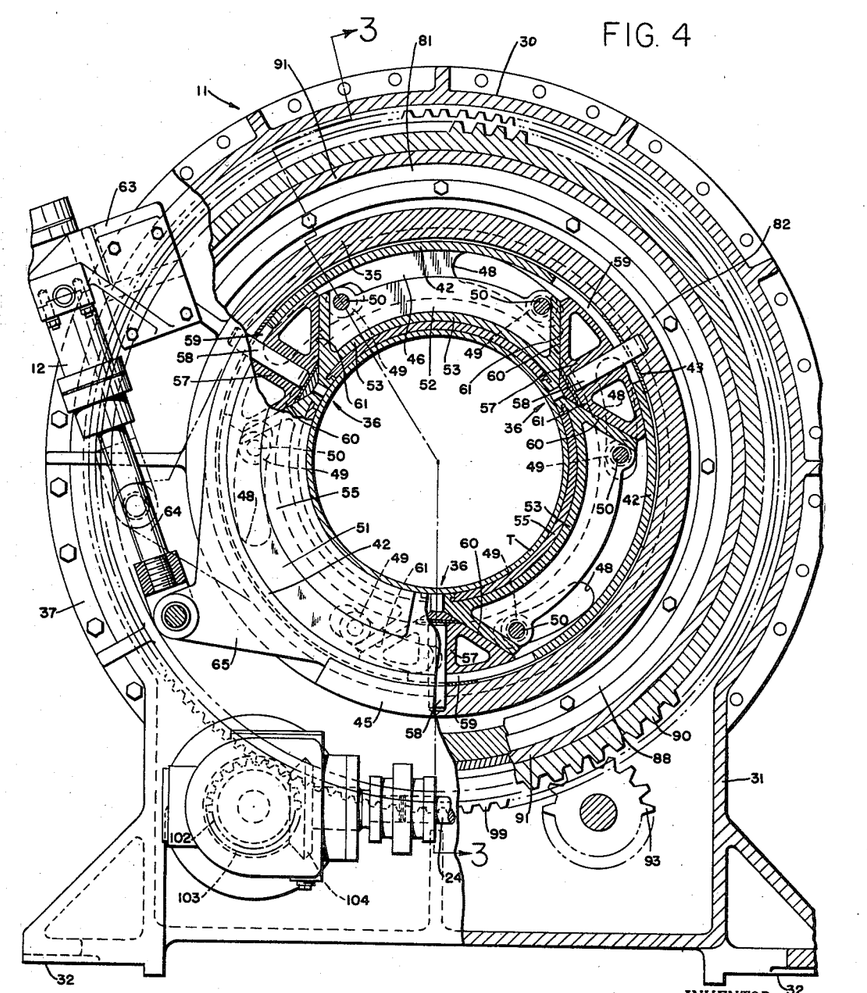
Figure 4 is an enlarged end view, partly in section, of the cutting head showing the pipe clamping mechanism.

The actuating ring 42 is provided with inwardly extending flanges 46 having camming slots 48. These slots are engaged by rollers 49 on pins 50. Pins 50 are retained in place by split retainer rings 51 and are carried by the outwardly projecting flanges 52 on segmental clamping shoes 53. Clamping shoes 53 also carry tube engaging pads 54 and 55, pads 55 having flared mouth portions to guide the tube into the clamp. The clamping shoes are guided for movement toward the center of the housing by means of guide members 57, which are secured to the sleeve portion 35 of the housing 30 by pins 58, the actuating member 42 being slotted as at 59 to receive the pins and to permit the actuating member to be rotated without interference with the pins. Guide members 57 have guiding surfaces 60 which engage corresponding guiding surfaces 61 on the ends of the clamping shoes 53. The surfaces 61 on each shoe are parallel to each other, and the surfaces 60 on the guide members are disposed at such angles with respect to each other that they will guide the segments directly toward the center of the housing and the center of a tube to be clamped in the housing. Guide plates 62 also aid in guiding the movement of the shoes 53 to and from the pipe P.

Figure 2:
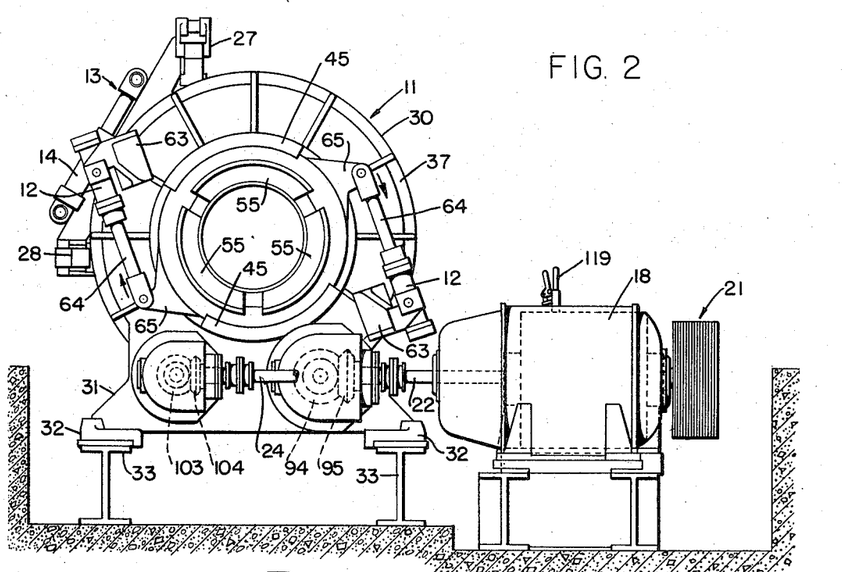
Figure 2 is and end elevation of the cut-off machine shown in Figure 1, the view being taken as indicated by line 2—2 of Figure 1.

As noted above the tube clamp is actuated by clamping cylinders 12. These cylinders, as shown in Figure 2, are mounted on suitable brackets 63 secured to the housing 30, and their piston rods 64 are pivotally connected to flanges 65 which project outwardly from the actuating member 42 between the retainer ring segments 45. Actuation of the cylinders thus rotates the actuating member 42 with respect to the housing and with respect to the clamping shoes 53 which are held against rotation by the guide members 57. The movement in clamping direction is counterclockwise, as shown in Figure 4, the motion being from the broken line position to approximately the full line position. This movement results in the shoes being cammed inwardly as the rollers 49 on pins 50 carried by the shoes are moved inwardly by engagement with the camming slots 48 in the inwardly extending flanges 46 of the actuating member 42.

Figure 5:
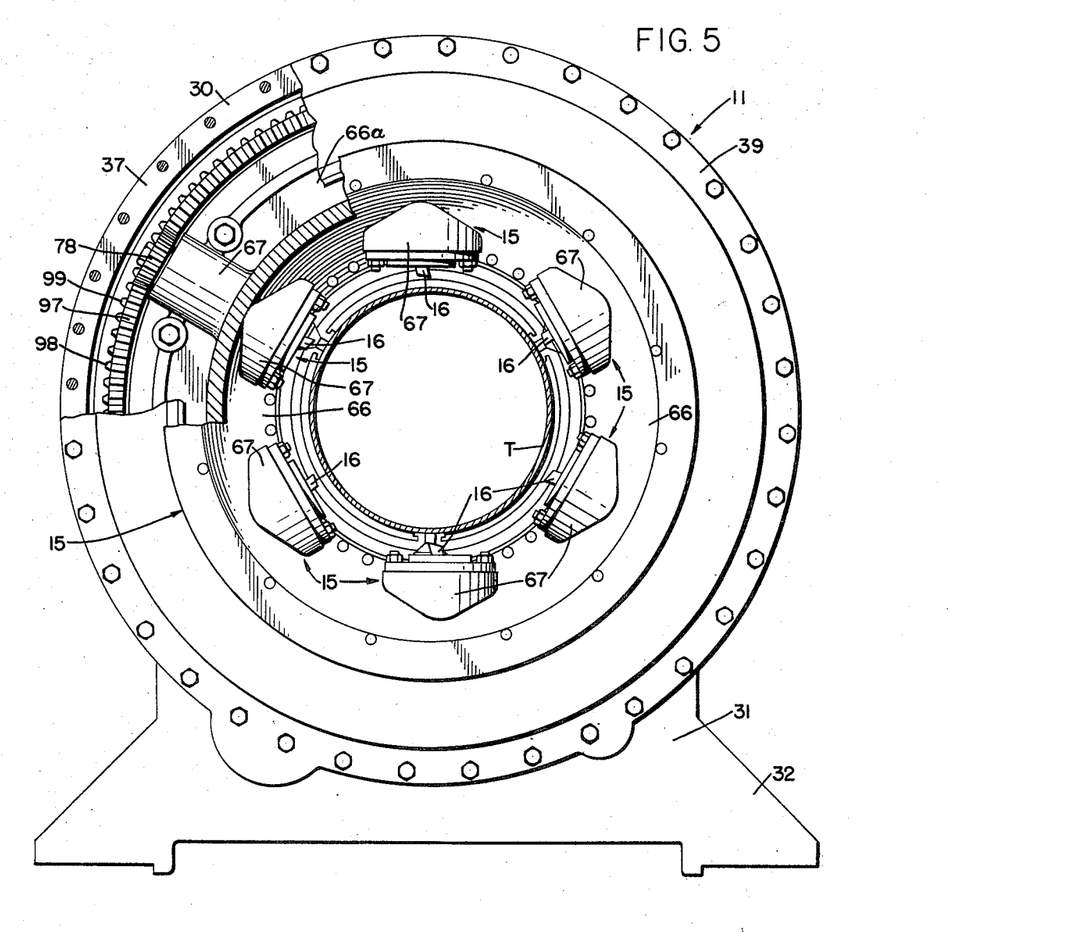
Figure 5 is an end elevation of the cutter head, taken along the line 5—5 of Figure 1 and with some of the parts broken away.
Figure 6:
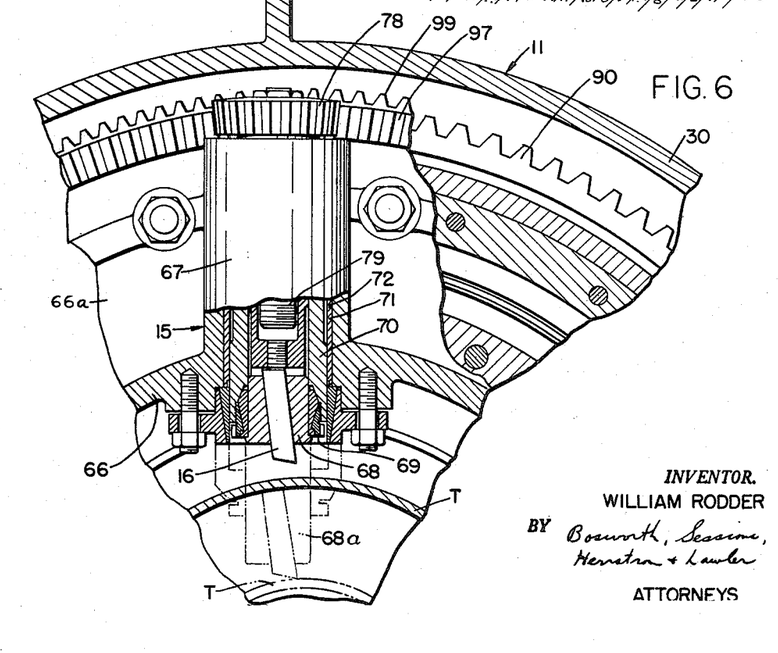
Figure 6 is an enlarged fragmentary section taken along the line 6—6 of Figure 3.

With the tube thus securely held by the clamping mechanism, rotation of the tool carrier 15 and the advancement of the tools 16 result in cutting off the tube. The tool carrier 15, as shown in Figures 3, 5, and 6, is an annular member having conical and radial web portions 66 and a plurality of bosses 67, each of which supports a tool 16 in its appropriate holder 68. Several tools and tool holders are employed so that the pipe can be cut rapidly with a comparatively small number of revolutions of the tool carrier and yet each tool makes a reasonably light cut. In the present instance six tools 16 are employed. As shown particularly in Figure 6, each tool is mounted in a holder 68 and the holders are carried by collets or chucks 69 mounted at the ends of sleeves 70 which are mounted for sliding motion but held against rotation by keys (not shown) within the bearing sleeves 71 in the bores 72 of the bosses 64. Extension tool holders 68a (shown in dotted lines in Figure 6) may be used for cutting tubes of relatively small diameter.

In order to advance and retract the sleeves 70 and tools 16, the outer ends of the sleeves are recessed to receive nuts 73 (Figure 3) which are secured to the sleeves by screws 74. Nuts 73 are engaged by screws 75 mounted for rotation by bearings 76 supported in the upper end portions 77 of the bosses 67, and bevel pinions 78 are keyed to the outer ends 79 of the screws 75. It is evident that with this arrangement rotation of the pinions results in advancing or retracting the tools toward or away from the tube, depending upon the direction of rotation.

In order to provide for rotation of the tool carrier 15 about the tube, and also to provide for advancing and retracting the tools while the tool carrier is rotating, the carrier is secured to an annular supporting ring 81 (see Figure 3). Ring 81 is mounted by means such as an "X" bearing 82 on the reduced projecting portion 83 of the sleeve 35. Bearing 82 is retained on projecting portion 83 by a retainer ring 84 which has projections 85 to fit within corresponding grooves 86 in the radial web portion 66 of tool carrier 15 in order to prevent the entry of dust and dirt into the bearing. Bearing 82 is also held against shoulder 87 of ring 81 by a retainer ring 88. The "X" type bearing 82 resists thrust in both radial and axial directions, and a single bearing is adequate to support the entire rotating tool carrier 15 and the ring 81. The use of this type of bearing makes possible a compact apparatus with the axial length of the cutting mechanism kept to a minimum. The shortness of the cutting mechanism enables pipe to be fed into and out of the machine rapidly and improves the speed of operation of the machine.

Ring 81 and tool carrier 15 are rotated by means of a ring gear 90 secured to flange 91 of ring 81 by a retainer ring 92. The ring gear 90 is driven by a pinion 93 which constitutes the main drive for the cutter head and which, in turn, is driven by bevel pinions 94 and 95 (see Figure 2), pinion 95 being driven by main drive shaft 22.

In order to rotate the pinions 78 and advance and retract the tool holder 68 and tool 16, the pinions 78 are engaged by the bevel teeth 97 of ring gear 98, which also has spur teeth 99 as shown in Figures 3, 4 and 6. Ring gear 98 is carried by a bearing 101 on ring 81, and thus ring gear 98 is rotatable with respect to ring 81 and tool carrier 15. Ring gear 98 is driven by pinion 102, which, in turn, is driven by bevel gears 103 and 104 and tool feed shaft 24 leading from the gear box 20.

With this arrangement, so long as gears 90 and 98 are rotated at the same speed, then gear 98 will not rotate with respect to the ring 81, nor with respect to the tool carrier 15 and the pinions 78. Thus, the pinions 78 and screws 75 will not rotate, and the tools 16 will be neither advanced nor retracted. However, if the gear 98 is driven at a speed different from the speed of the gear 90 and ring 81, then the gear will rotate relative to the tool carrier 15 and the pinions 78; and depending upon whether the gear 98 is driven slower or faster than the gear 90 and the tool carrier, the pinions 78 and screws 75 will be rotated in directions to cause the tools 16 to be either advanced or retracted. In the embodiment shown the arrangement is such that the tools are retracted when the gear 98 is driven at a higher speed than the tool carrier and are advanced when the gear 98 is driven at a slower speed than the tool carrier.

Figure 7:
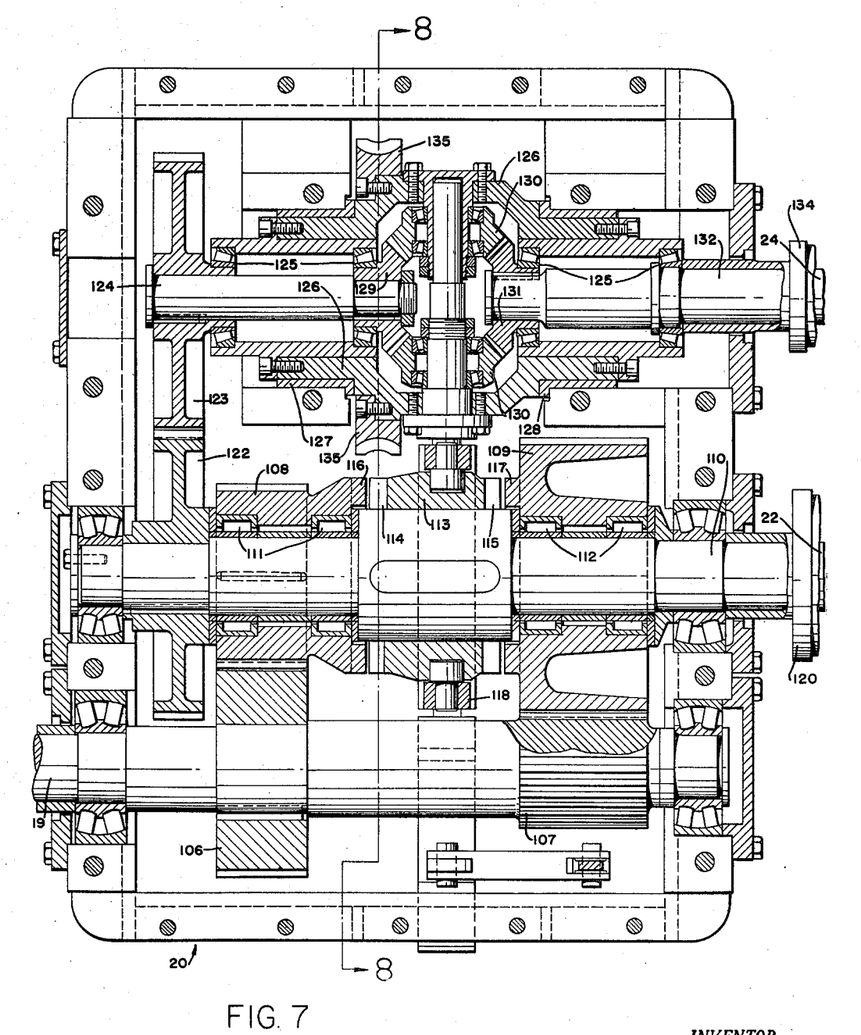
Figure 7 is a top plan view on an enlarged scale of the gear drive for the apparatus, the cover of the gear casing being removed and parts being broken away for convenience of illustration.
Figure 8:
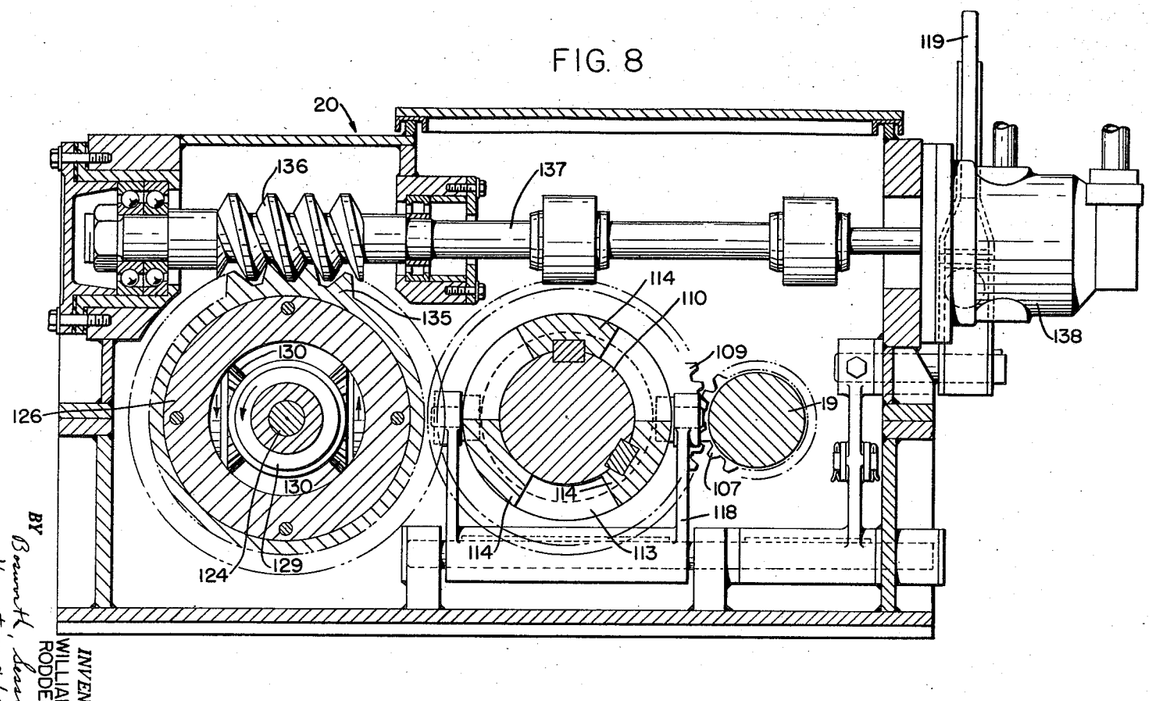
Figure 8 is a vertical sectional view through the gear drive, the section being taken along line 8—8 of Figure 7.

*Drive mechanism.*—The main drive shaft 22 and the tool feed shaft 24 are driven by the motor 18 through the gear box 20 which is illustrated particularly in Figures 1, 7, and 8. In order to provide a wide range of cutting speeds, motor 18 is a variable speed motor and the gear box provides two speed ratios between the input shaft 19 and the main drive shaft 22. The input shaft 19 of the gear box is driven by the motor through the V-belt drive 21 and carries two spur gears, 106 and 107, which are constantly in mesh with spur gears 108 and 109, respectively, carried by the counter shaft 110. Gears 108 and 109 are mounted on countershaft 110 by appropriate bearings 111 and 112, respectively, and are rotatable with respect to the counter shaft. They may be selectively keyed to the countershaft, however, by means of the sliding clutch member 113 which is slidable on the central portion of the shaft 110 and is keyed thereto.

Clutch member 113, shown in neutral position in Figure 7, carries jaw clutch elements 114 and 115 at opposite ends thereof; these are arranged to engage selectively corresponding clutch elements 116 and 117 on the gears 108 and 109, respectively. By means of clutch element 113, then, countershaft 110 may be driven at two different speeds with respect to the input shaft 19, the clutch member being slidable along the shaft by a conventional shifter fork 118 and a manual control handle 119. Shaft 110 is coupled directly to main drive shaft 22 by means of a coupling 120, which may take any convenient form.

In order to drive tool feed shaft 24 at variable speeds with respect to the main drive shaft, counter shaft 110 carries a gear 122 which meshes with gear 123 carried by differential input shaft 124. Shaft 124 is supported in appropriate bearings 125 in the differential housing 126, and housing 126, in turn, is supported for rotation with respect to the main gear box 20 by means of bearings 127 and 128. The drive from shaft 124 is through the differential input gear 129, the planet gears 130, which are mounted in the differential carrier 126, and the differential output gear 131 which is carried by the differential output shaft 132. Shaft 132 is coupled directly to the tool feed shaft 24 by any convenient coupling 134.

In the arrangement shown, shaft 124 is driven at the same rotational speed as shaft 110. So long as differential carrier 126 is held against rotation, differential output shaft 132 and tool feed shaft 24 will be driven at the same speed as shaft 124 but in the opposite direction of rotation. Shaft 124 rotates in the opposite direction from shaft 110 but at the same speed of rotation. Hence, differential output shaft 132 rotates in the same direction and at the same speed as shaft 110 so long as the differential carrier is held stationary.

The speed reduction between pinion 93 and ring gear 90 is the same as the speed reduction between pinion 101 and ring gear 98. Therefore, so long as the differential carrier is stationary, ring gear 98 will be driven at the same speed as gear 90 and tool carrier 15. There will be no rotation of the pinions 78 about their axes, and the tools will be neither advanced nor retracted. However, by rotating differential carrier 126, the shaft 132 and tool feed shaft 24 can be caused to rotate at a different speed than shaft 22, and gear 98 can be rotated either faster or slower than the ring gear 90 and the tool carrier. Such rotation will advance or retract the tool 16 as heretofore described; the amount by which the tools are advanced or retracted will depend upon the number of turns given to the differential carrier; the speed at which the tools are advanced or retracted will depend upon the rate of speed of rotation imparted to the differential carrier. Thus, the tools can be advanced or retracted at desired speeds to accurately determined positions by suitable controls for the mechanism for rotating the differential carrier.

The differential carrier 126 is rotated by means of a worm wheel 135 (see Figures 7 and 8) secured to the exterior of the carrier and engaged by a worm 136 mounted on the transverse shaft 137 which is driven by the hydraulic motor 138. Motor 138 is of the positive displacement reversible type and is controlled by appropriate limit switches and valves in the hydraulic system so that it may be operated manually or automatically. In automatic operation, starting with the tools in retracted position, the motor is operated at high speed in the advancing direction to bring the tools 16 close to the work; it is then operated at a lower speed in advancing direction to feed the tools inwardly as the pipe is being cut off; and after the cut is completed, it is operated at high speed in the reverse or retracting direction to bring the tools back to their starting positions. The hydraulic motor is then shut off or placed in neutral. When the hydraulic motor is stationary, the differential carrier 126 is held against rotation by engagement between the worm 136 and worm wheel 135 and the tool feed shaft 24 is then rotated at precisely the same speed as the main drive shaft 22 so that the tools 16 are neither advanced nor retracted.

Figure 9:
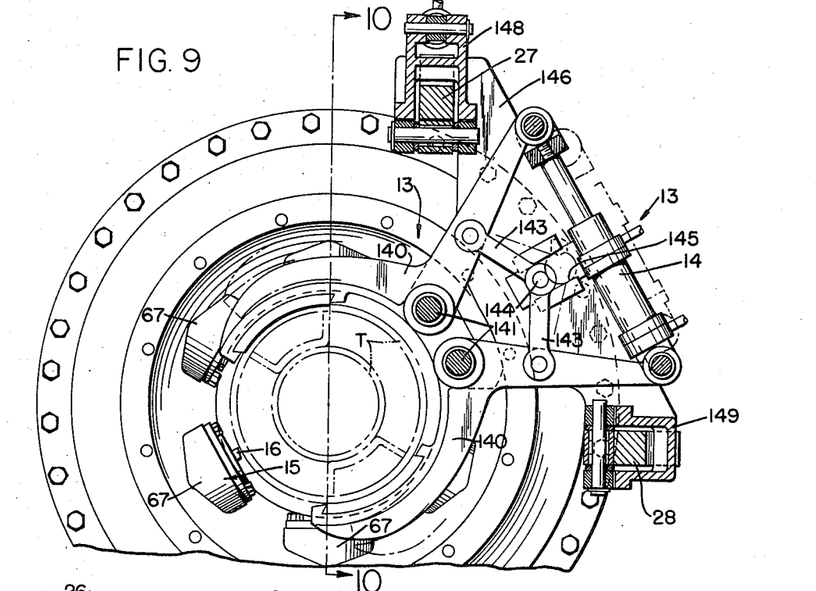
Figure 9 is a transverse sectional view at right angles to the axis of the tube taken as indicated by line 9—9 of Figures 1 and 10.
Figure 10:
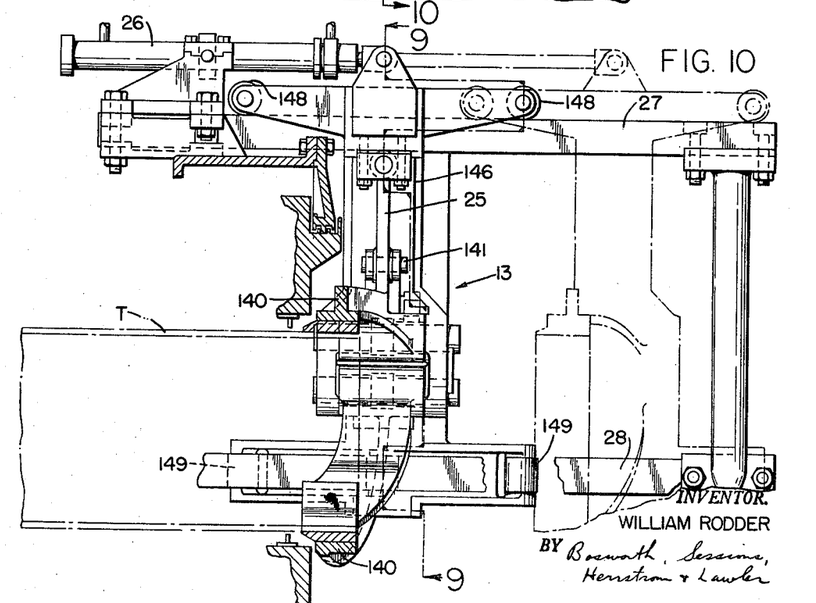
Figure 10 is a sectional view parallel to the axis of the tube and showing the mechanism for conveying away the crop end of the tube, the section being taken as indicated by lines 10—10 on Figure 9.

*Crop end clamp.*—When the body of the pipe is gripped by the tube clamping mechanism 36, the crop end of the tube is simultaneously gripped by the clamping mechanism indicated in general at 13 in Figure 1 and illustrated in greater detail in Figures 9 and 10. This mechanism is carried by the carriage 25 which is mounted on rails 27 and 28 for movement in directions parallel to the axis of the tube. The clamp comprises tong-like gripping members 140 which are pivotally supported on the carriage 25 by pivots 141 and which are actuated by the clamping cylinder 14. Clamping members 140 are guided by pivoted links 143, the common pivotal connection 144 of the links 143 being guided in a slot 145 in the carriage frame member 146. It will be noted that the pivots 141 are above the center of the tube, and the gripping members 140 extend downwardly at an angle therefrom so that the crop end of a tube can simply drop or roll out of the clamp when the gripping members are released.

The carriage is supported on the rails 27 and 28 by rollers 148 and 149, respectively, and is arranged to be reciprocated along the rails by cylinder 26. In operation the carriage is moved to clamping position as shown in Figure 1, and there the cylinder 14 is actuated to cause the clamps 140 to grip the end of the tube. After the crop end of the tube has been cut off, the cylinder 26 is actuated to move the carriage 25 along the rails 27 and 28 to remove the end of the tube from the cutting head 11. This movement is to the left in Figure 1 of the drawings and to the right in Figure 10, to the position indicated in broken lines. In this position the clamps 140 are released and the crop end of the tube is discharged down a chute, for example, to a conveyor or to a crusher in which the crop end is flattened. After the crop end of the tube has been dropped by the tongs, the cylinder 26 is operated to return the carriage to its original position shown in full lines in Figure 10.

*Summary of operation.*—The machine is arranged to be operated by one man by the use of suitable push button controls. The cycle of operations involves first the positioning of the tube within the cutter head by means of the conveyor 10. Next, the tube clamping cylinders 12 and the crop end clamp cylinder 14 are actuated to close both the tube clamps and the crop end clamps on the machine. The end of the tube is then cut off through the automatic cycle of rapid advance of the tools, feed of the tools through the cutting stroke, and rapid return of the tools to their retracted position.

The cylinders 12 are then actuated to open the tube clamping mechanism 36, and the pipe is conveyed out of the cutter head 11. At the same time the cylinder 26 is actuated to move the crop end clamp carriage away from the cutter head 11. The crop end clamp 13 is then opened to discharge the end crop, the clamp is returned to its original position by the cylinder 26 and the apparatus is ready to cut off the end of another pipe.

While only a single cut-off machine is shown in the accompanying drawings, the machines preferably are used in pairs so that while one cut-off machine is cutting off one end of one tube section, the other cut-off machine is cutting off the other end of the other tube section. With such an arrangement the complete cycle of operation which involves cutting off two ends, one on one tube section and the other on another tube section, can be accomplished in from one minute or less to about a minute and a half, depending on the size and wall thickness of the tube, for tubes of from sixteen inches to twenty-six inches in diameter and with wall thicknesses of one-half inch or more.

The differential control for the tool feed provides a positive means for positioning and feeding the tools accurately. This makes it possible rapidly to advance the tools into close proximity to the tube and then feed them during the cutting portion of the cycle at the desired speed. The apparatus is sturdy and adapted for heavy-duty service, and the mounting of the rotating cutter heads enables the axial length of the apparatus to be kept at a minimum. The apparatus, accordingly, can be operated with relatively short time cycles and comparatively high rates of production.

Those skilled in the art will appreciate that various modifications can be made in the invention without departing from the spirit and scope thereof. The essential characteristics of the invention are defined in the appended claims.

I claim:

1. A tube cutoff machine comprising a rotary tool carrier, a main drive gear secured to said tool carrier for driving the same, a plurality of circumferentially spaced tool holders slidably mounted in said rotary tool carrier, tools carried by said tool holders, means for advancing and retracting said tool holders, a tool feed ring gear rotatably mounted on said rotary tool carrier for actuating said advancing and retracting means, and means for driving said ring gear at variable rates of speed with respect to said main drive gear, said means including power means for driving said main drive gear, driving connections between said power means and said ring gear, said driving connections including differential gearing, and additional variable speed reversible power means acting on said differential gearing.

2. A tube cutoff machine comprising a rotary tool carrier, a main drive gear secured to said tool carrier for driving the same, a plurality of circumferentially spaced cutting tools carried by said tool carrier, means associated with each tool for advancing and retracting the same, a tool feed gear rotatably mounted on said rotary tool carrier for actuating said tool advancing and retracting means, main drive means for driving said main drive gear, tool feed drive means for driving said tool feed gear, and means including differential gearing between said main drive means and said tool feed drive means and a variable speed, reversible motor acting through said differential gearing for driving said tool feed drive means at variable rates of speed with respect to said main drive means.

3. Apparatus according to claim 2, wherein the differential gearing includes a differential input gear driven from said main drive means, a differential output gear driving said tool feed drive means, and a planet gear engaging said input and output gears and mounted in a rotatable differential carrier, and wherein said variable speed reversible motor is adapted to rotate said differential carrier.

4. Apparatus according to claim 2, wherein the motor is a positive displacement hydraulic motor.

5. Apparatus according to claim 2, wherein a worm wheel is mounted on said differential carrier, said worm wheel being engaged by a worm, said worm being driven by said variable speed reversible motor.

References Cited in the file of this patent

UNITED STATES PATENTS

| | | |
|---|---|---|
| Re. 20,974 | Guirl et al. | Jan. 10, 1939 |
| 723,358 | Bradford | Mar. 24, 1903 |
| 1,100,747 | Krauss | June 23, 1914 |
| 1,248,079 | Clifton | Nov. 27, 1917 |
| 1,350,746 | Spillmann | Aug. 24, 1920 |
| 1,828,371 | Hyde et al. | Oct. 20, 1931 |
| 2,287,833 | Ridgway | June 30, 1942 |
| 2,289,167 | Bannister et al. | July 7, 1942 |
| 2,326,463 | Johnston | Aug. 10, 1943 |
| 2,373,472 | Haumiller | Apr. 10, 1945 |
| 2,484,601 | Abbey | Oct. 11, 1949 |
| 2,528,442 | Leifer | Oct. 13, 1950 |
| 2,649,886 | Palmer | Aug. 25, 1953 |
| 2,681,106 | Long | June 15, 1954 |
| 2,817,533 | Herbst | Dec. 24, 1957 |